United States Patent

Hyyppa et al.

[11] 3,793,731
[45] Feb. 26, 1974

[54] ANGLE POSITION INDICATOR
[75] Inventors: Eino J. Hyyppa, North Hollywood; Chester L. Reed, Burbank, both of Calif.
[73] Assignee: The United States of America as represented by the Secretary of the Navy, Washington, D.C.
[22] Filed: July 12, 1972
[21] Appl. No.: 271,100

[52] U.S. Cl. ............... 33/1 PT, 33/172 E, 114/162
[51] Int. Cl. ............................................. G01c 1/00
[58] Field of Search ............ 33/1 N, 1 PT, 172 E; 114/144 R, 162; 340/177

[56] References Cited
UNITED STATES PATENTS
1,928,457  9/1933  Mershon et al. ............... 340/195
2,261,541  11/1941  De Sart, Sr. ..................... 340/195
2,717,453  9/1955  Wildt .............................. 33/174 C Primary Examiner—William D. Martin, Jr.
Attorney, Agent, or Firm—Richard S. Sciascia; Ervin F. Johnston; William T. Skeer

[57] ABSTRACT

A sensor mechanism is provided to detect movements of rudders about axes which are perpendicular to a propeller axis on a propeller-driven vehicle. Follower arms are configured to engage rudders of the propeller-driven vehicle and be moved in response to movements thereof. The followers are constrained to rotate about a fixed shaft, the rotation of which is coupled, via suitable mechanical amplifier means, to electromechanical transducer. An interlock is provided to cause the arms to engage the rudders when the mechanism is mounted on the propeller shaft and to retract the followers to inoperative position when the device is removed from the propeller shaft.

9 Claims, 5 Drawing Figures

ANGLE POSITION INDICATOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains generally to the field of test instrumentation. More particularly, this invention pertains to a test mechanism which provides an electrical analog of mechanical movement. In greater particularity, the invention pertains to a sensor mechanism to detect rotational movement of a rigid member. Further, this invention pertains to the detection of a rotary movement of a rigid member about an axis of rotation which is disposed at right angles to a datum axis. In still greater particularity, but without limitation thereto, this invention will be described as it pertains to a sensor mechanism to detect and provide electrical analogs of the movement of rudders about propeller shaft of a propeller-driven vehicle. Further, this invention will be described as it pertains to a test instrument used to detect the movement of a control rudder of a torpedo vehicle.

DESCRIPTION OF THE PRIOR ART

Previous to this invention, testing of control rudder response of torpedoes prior to their use has required a plurality of individual tests which are accomplished either visually or with the use of mechanical fixtures. In order to incorporate data obtained by such tests into an electronic testing system, a manual correlation of controls in response to the observed angular movement of the control rudders was necessary. This system required observation of the movement of the rudder as represented on the mechanical fixture and the manual setting of a control input to the electronic system. Quite naturally, the previous tests resulted in errors being introduced into the system as a result of operational inaccuracies in either making the reading or in setting the control. In addition to the inaccuracies introduced by the prior art system, the system was time consuming and resulted in unnecessary delays where a plurality of devices were to be tested. As a direct result of this lack of uniformity in translating readings to inputs and the delay caused thereby, the resultant figures of merit were less accurate than is desirable in modern production techniques.

SUMMARY OF THE INVENTION

The present invention comprises a portable sensor mechanism which is advantageously mounted on the propeller shaft of a torpedo and which engages its rudders. The rudder engagement is accomplished by a pair of followers which pivot about mutually perpendicular axes which parallel the axes of movement of the torpedo's rudders. Suitable generating means coupled to the followers by means of mechanical amplifiers generate analog signals of the rudder movement. The sensor mechanism also incorporates interlock means to move the followers into engagement with the rudders of the torpedo upon being mounted on the torpedo's propeller shaft. Further, the interlock means retracts the follower arms to an inoperative, or protected, position during removal and subsequent remounting of the sensor mechanism. To facilitate the retraction into the frame, the followers incorporate a hinged elbow joint intermediate their length.

STATEMENT OF THE OBJECTS OF THE INVENTION

It is accordingly an object of this invention to provide a new and improved sensor mechanism.

A further object of the present invention is to provide a new and improved sensor mechanism to provide electrical analogs of mechanical movements.

Another object of the present invention is to provide a sensor mechanism which measures the rotational movement of two rigid members about mutually perpendicular axes.

A still further object of the present invention is to provide an improved sensor mechanism which may be manually mountable on any of a plurality of devices to be tested.

Still another object of the invention is to provide an electromechanical sensor mechanism having mechanical amplifier means to increase the electromechanical sensitivity thereof.

Another object of the present invention is to provide a sensor mechanism having retractable follower means.

A further object of the present invention is to provide an electromechanical sensor mechanism to measure the displacement of the rudders of a propeller-driven vehicle.

Another object of this invention is to provide an electromechanical sensor mechanism which automatically positions the sensor followers for mounting the device in a predetermined relation to the device being tested.

A still further object of the present invention is to provide a sensor mechanism which may be used in combination with other electronic test instruments for test assembly for marine torpedoes.

These and other objects of the invention will become more readily apparent from the ensuing specification when taken with the drawings.

DESCRIPTION OF THE PREFERRED EMBODIMENT

Figure 1:
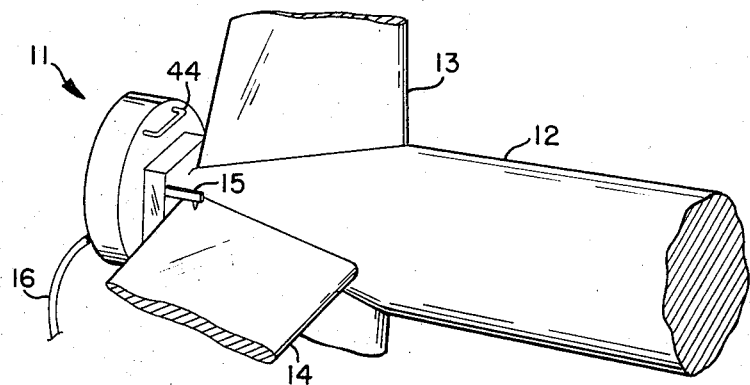
FIG. 1 is a perspective view of the device of the invention installed on a torpedo being tested.

Referring to FIG. 1, a sensor mechanism 11 according to the invention is shown mounted on the aft end of a torpedo 12. As will be understood by those versed in the art, torpedo 12 has a plurality of control rudders or fins 13 and 14 which serve to guide the vehicle in the water. When mounted on torpedo 12, sensor mechanism 11 detects the movement of fins 13 and 14 by means of a suitable follower arm assembly 15 shown engaging control fin 14.

Figure 2:
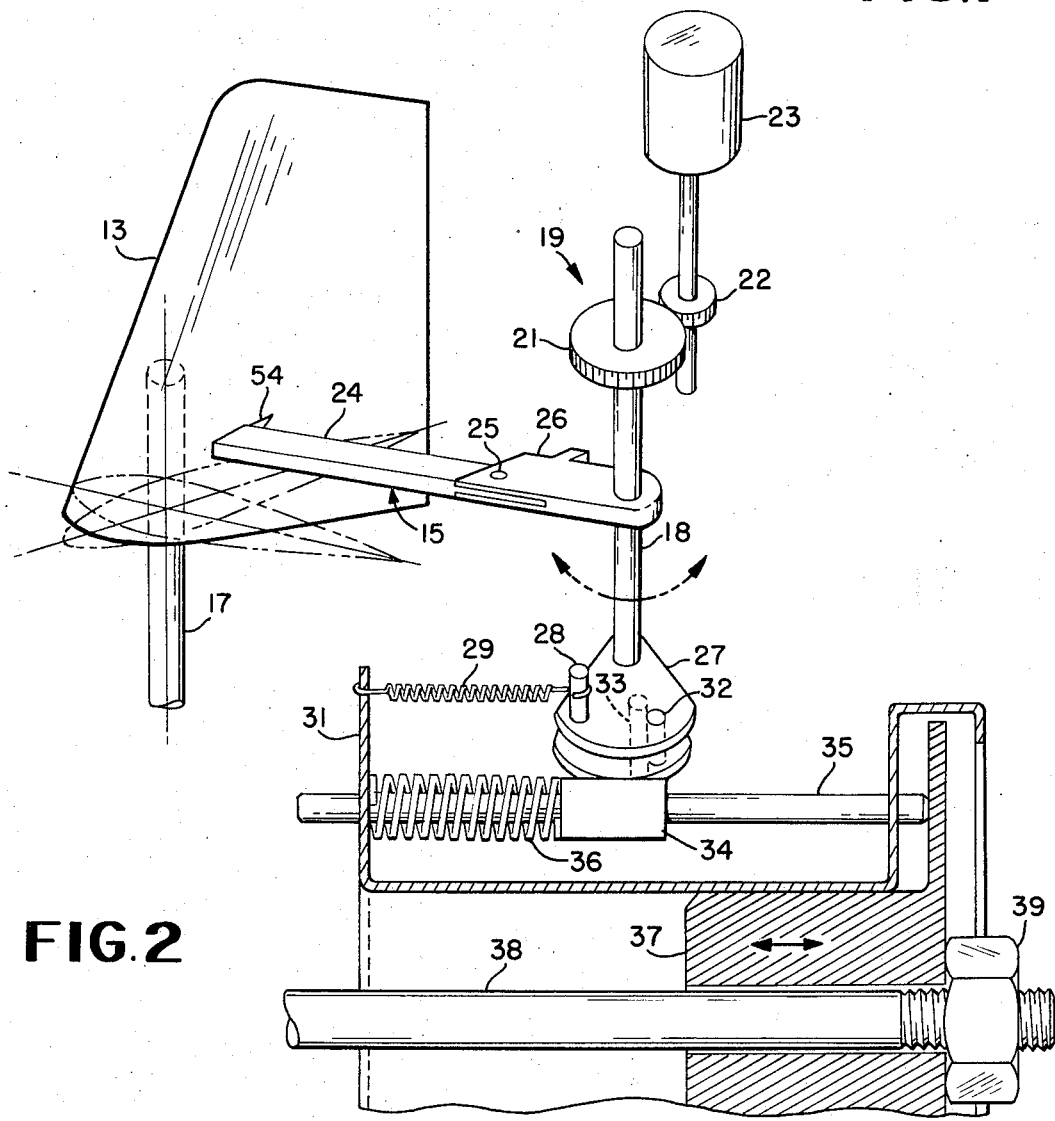
FIG. 2 is a schematic representation of the basic components of the invention.

An electrical cable 16 includes a plurality of electrical conduits and may be attached to suitable test instruments or readout indicators, not shown. For purposes of simplicity of illustration and clarity of explanation, the electrical circuitry connecting cable 16 to the various electromechanical transducers contained within sensor mechanism 11 will not be described. However, those who are versed in the electronic art will recognize that such wiring is a conventional straightforward connection and is made in dependence upon the type of electromechanical transducer that is utilized. Referring to FIG. 2, a simplified diagrammatic showing of the basic components of a single detection mechanism will be described. Control fin 14 rotates about a drive shaft 17 between the positions shown in the broken lines. Follower arm assembly 15 is in contact with fin 14 and moves so as to move shaft 18 in response to the movement of control fin 14 in the directions indicated by the arrow. The rotation of shaft 18 is magnified by means of a suitable mechanical amplifier shown generally at 19.

In the illustrated embodiment, mechanical amplifier 19 is comprised by two meshing gears 21 and 22. As will be well understood, gear 21, being the larger of the two, rotates gear 22 through a greater angle than it is moved by shaft 18. Gear 22 is connected to the input shaft of a suitable electromechanical transducer, such as servo generator 23. Of course, other types of electromechanical transducers may be used in place of servo generator 23, if desired. For example, a piezoelectric element may be driven by gear 22.

It will be observed that follower arm assembly 15 has an outer arm 24 which is pivotally connected by means of pin 25 to an inner arm 26 which, in turn, is attached to shaft 18. Attachment of inner arm 26 to shaft 18 may be made by any conventional means such as, for example, a suitable set screw, not shown.

Pin 25 forms an elbow joint in follower arm assembly 15 to permit outer arm 24 to close toward inner arm 26 in one direction only. This elbow action is to facilitate protective withdrawal of follower arm assembly 15 in a fashion to be more completely described later in connection with FIG. 3. Likewise, follower arm assembly 15 is spring biased by means of a spring, to be described, to its extended or illustrated position.

A suitable pin gear 27 is also supported on shaft 18 and is placed at a suitable distance from follower arm 15. One of the functions of pin gear 27 is to keep follower arm assembly 15 in engagement with control fin 14. This is accomplished by means of a pin 28 which provides connective support for a suitable spring means, such as coil spring 29, the other end of which is attached to a frame member 31.

The second pin 32 is also carried by pin gear 27 and is engaged by a follower pin 33. Follower pin 33 is, in turn, attached to a collar 34 which is secured by means, not shown, to a rod 35. Rod 35 is reciprocally held in frame 31 and is biased by means of a suitable spring 36 in a direction to cause shaft 18 to rotate oppositely from that rotation imparted by means of spring 29.

Rod 35 is drivingly engaged by means of a collar 37. Collar 37 is retained within frame 31 and fits concentrically about propeller shaft 38 of the torpedo 12 being tested. Collar 37 together with frame 31 is held on the aft end of torpedo 12 by means of a suitable mounting means, such as, for example, a nut 39. The tightening of mounting nut 39 forces collar 37 along the propeller shaft 38 toward the forward end of torpedo 12, thereby pushing rod 35 in a similar direction. As rod 35 is urged forward, follower pin 33 is drawn away from pin 32 to permit pin gear 27 to be rotated by spring 29 so as to force follower arm 15 into engagement with control fin 14.

When mounting nut 39 is removed, such as to remove sensor mechanism 11 from torpedo 12, collar 37 is moved aft along shaft 38 permitting rod 35 to follow collar 37, under the urging of spring 36, and forces engaging pin 32 to engage and move pin follower 33. Because spring 36 is much stronger than spring 29, the movement of rod 35 continues to expand spring 29 and cause rotation of shaft 18 in such a direction as to withdraw follower arm assembly 15 from control fin 14. As will be presently seen, this movement continues until arm 15 is moved to a protected position within a suitable enclosure such that it will not be damaged in movement of sensor mechanism 11 from torpedo to torpedo.

Figure 3:
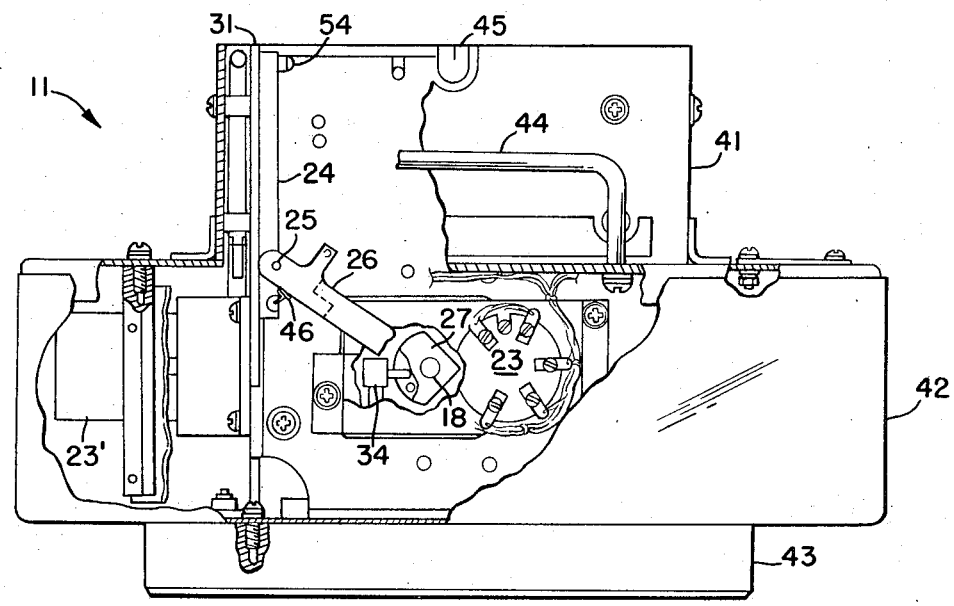
FIG. 3 is a top plan view of the device of the invention having portions thereof cut away.
Figure 4:
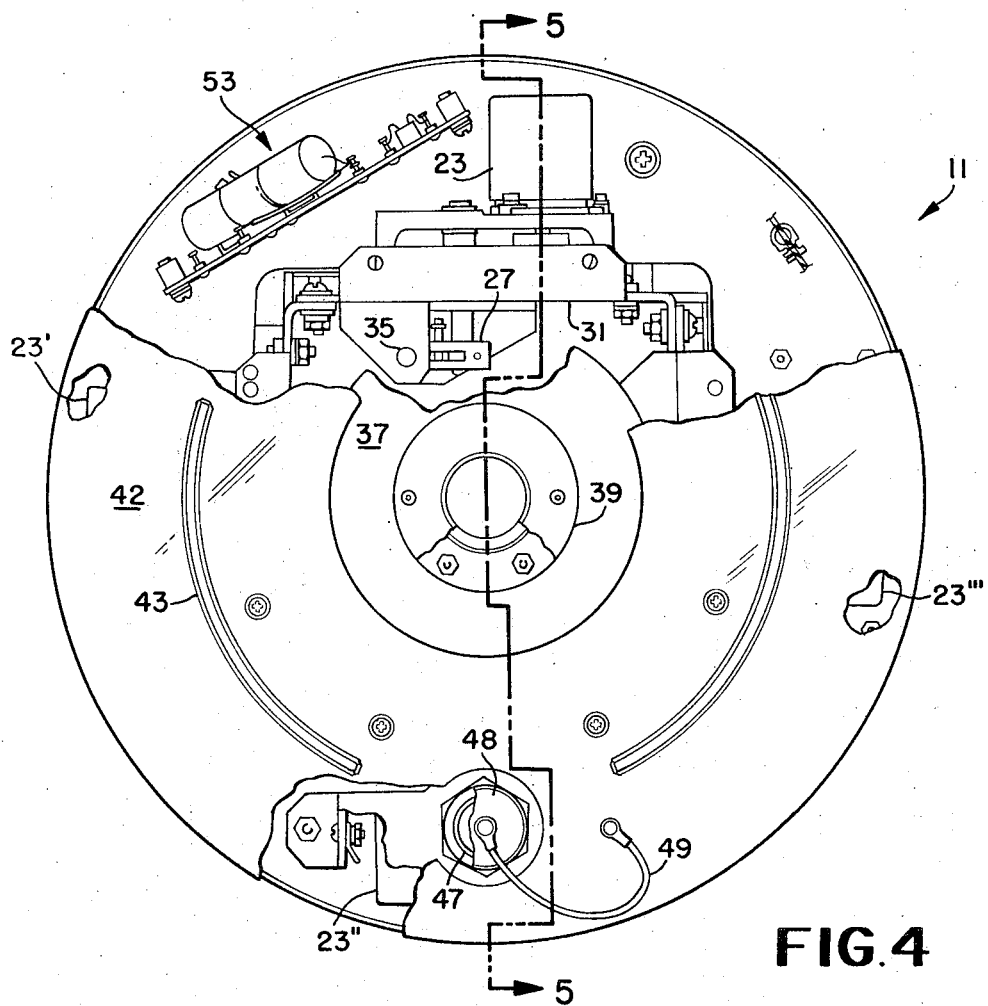
FIG. 4 is an end elevational view of the device of the invention having portions thereof cut away for purposes of illustration.

Referring to FIGS. 3 and 4, the constructional details of the preferred embodiment may be seen. As shown, in the actual preferred embodiment the sensor mechanism of the invention incorporates four angle position indicators of the type previously described in connection with FIG. 2. Since each of the systems function independently of the others, a smaller number may be used, if desired. As may be best seen in FIG. 5, each of the four sensor mechanisms are disposed equidistantly about the axis of the complete sensor mechanism and are indicated by their associated electromechanical transducers 23, 23', 23'', and 23'''. Each of the systems is identical to the others and for purposes of clarity only one set of sensor mechanisms will be described in each view.

The forward portion of frame 31 of sensor mechanism 11 is enclosed by a generally rectangular forward cover 41. The portion of sensor mechanism 11 aft of that enclosed by cover 41, such as the aforedescribed electromechanical transducers, are enclosed by a generally cylindrical aft cover 42. A protective ring 43 extends outwardly from the aft surface of aft cover 42 and provides a protection from mechanical damage to other components to be described as well as providing a resting surface for the mechanism when it is not mounted on a vehicle being tested.

On the forward edge of aft cover 42, a handle 44 is mounted. Handle 44 facilitates the installation and removal of sensor mechanism 11 from the torpedoes being tested. If desired, an index plate 45 bearing a suitable alignment indicium may be included on cover 41 to facilitate alignment of sensor mechanism 11 with the device under test.

Referring to FIG. 3, the elbow joint arrangement between outer arm 24 and inner arm 26 may be more clearly seen. As shown, a suitable spring 46 is attached between the inner end of outer arm 24 and a protrusion extending inwardly from inner arm 26. As indicated by the broken line contour, inner arm 26 is configured to prevent outer arm 24 from obtaining a greater flexure than that which would bring it in line with inner arm 26. Of course, this is necessary to preserve the accuracy of the measuring system of the invention.

Referring to FIG. 4, additional mounting details of the system of the invention may be seen. It will be observed, that mounting nut 39 has been configured to facilitate manual installation rather than the hexagonal nut configuration shown in FIG. 2. Also, FIG. 4 shows the placement of an electrical socket 47. Of course, socket 47 provides electrical connection of a system of the invention to appropriate test assemblies. Socket 47 is protected when not in use by a suitable socket cover 48. Socket cover 48 is, in turn, attached to aft cover 42 by means of a suitable flexible retainer 49. A short length of flexible steel cable has proven satisfactory for this purpose but, of course, other high tensile strength flexible materials may be used, if desired. Retainer 49 prevents cover 48 from becoming detached from sensor mechanism 11 and being accidentally enclosed within a torpedo 12 which, of course, would result in possible malfunction of the device.

Figure 5:
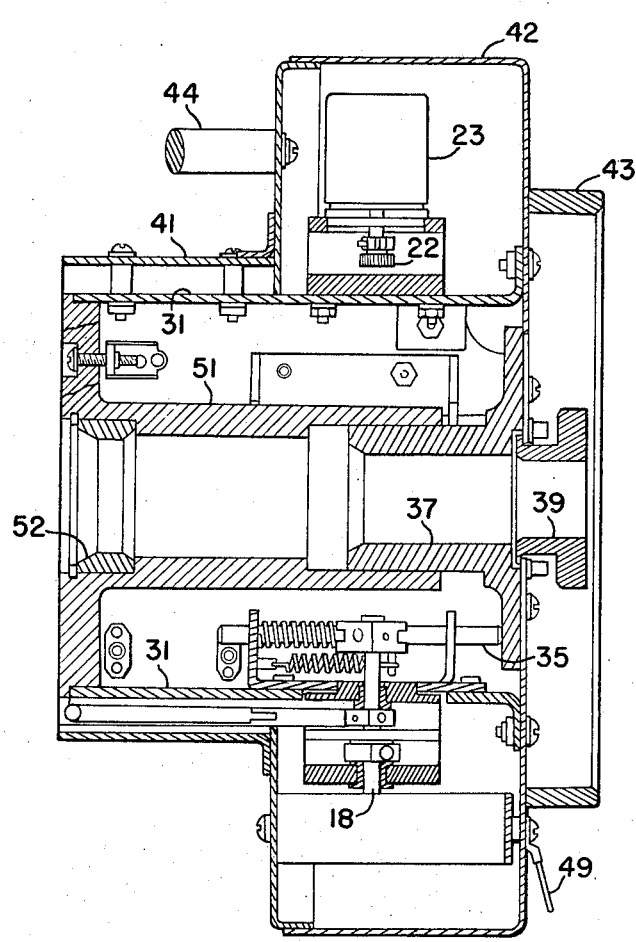
FIG. 5 is a sectional view taken along lines 5—5 of FIG. 4.

Referring to FIG. 5, which is a sectional view taken along lines 5—5 of FIG. 4, the constructional details of the center of sensor mechanism 11 may be more conveniently described. As shown, frame 31 is supported at its forward end on a suitable annular hub 51. Annular hub 51 has a central recess in the aft end thereof to slidingly receive collar 37 therein. At the forward end of annular hub 51, a suitable bushing 52 is placed.

Bushing 52 centers sensor mechanism 11 on the propeller shaft of the vehicle being tested. Of course, the bushing may be replaced to accommodate propeller shafts of different sizes. In this manner, the device of the invention may be easily modified to accommodate different ordnance devices. That is, by exchanging bushing 52 and mounting means 39 propeller shafts having different outside diameters and thread arrangements may be easily accommodated.

Referring again to FIG. 4, it will be observed that suitable electronic circuit boards 53 may also be enclosed within the confines of aft cover 42. These circuit boards provide the circuitry necessary to operate electromechanical transducers 23 and will vary in circuit design in accordance with the particular transducer employed. Therefore, no detailed description of the circuitry or the circuit board construction is necessary for the understanding of the present invention.

Although the foregoing description is sufficient to permit a person skilled in the instrumentation and marine engineering arts to make the invention, the invention will be more readily understood with reference to the following description of the operation.

Mode of Operation

To commence the operation of the device of the invention, the torpedo 12 to be tested is placed on a suitable cradle or support mechanism, not shown, and the propellers or driving screws are removed from the aft end thereof. The operator of the device picks up sensor mechanism 11 by means of handle 44 and aft cover 42 and positions it on the propeller shaft 38 of the torpedo being tested. Mounting means 39 is then attached to the threaded end of propeller shaft 38 formerly occupied by the propeller retaining means and tightened to secure sensor mechanism 11 on torpedo 12. Of course, during this operation the sensor mechanism is aligned with a reference position on the torpedo as facilitated by index plate 45.

As mounting means 39 is seated on the threaded propeller retaining portions, collar 37 is advanced along propeller shaft 38 and carries with it reciprocally mounted rods 35. Rods 35, in turn, move follower pin 33 in a forward direction to permit pin gear 27 acting under the influence of spring 29 to rotate shaft 18. As previously explained in the description of the mechanism of the invention, the rotation of shaft 18 moves sensor follower arm 15 from its retracted position into an extended position where it grips or engages the control fins 13 and 14 of torpedo 12.

It will be noted, with reference to FIG. 3, as the follower arm 15 is extended, spring 46 will straighten the arm such that outer arm 24 aligns itself with inner arm 26 to form a rigid follower. Follower arm 15 may directly engage the rudder 13 and 14 with its outer end or, if desired, contact points 54 may be provided on the ends to more accurately determine the index position of control fins 13 and 14. Of course, such follower contact members are well understood in the instrumentation art and it should not escape notice that they may be adjustably retained in outer end 24 of follower arm 15 such as to permit relative indexing between the various follower arms carried on sensor mechanism 11.

When thus installed, cover 48 is removed from socket 47 and electrical cable 16 connected thereto. As previously noted, cable 16 connects sensor mechanism 11 with appropriate test instrumentation, not shown. Torpedo 12 is then caused to undergo maneuvering signal changes in its guidance system to produce control action of rudders 13 and 14. This control movement of rudders 13 and 14 displace follower arms 15 about shaft 18 and, in consequence, drive electromechanical transducers 23 via mechanical amplifiers 19 as previously described.

When the test is concluded, the system is deenergized and cable 16 is removed from socket 47. Socket cover 48 is replaced to protect the socket. Sensor mechanism 11 is then removed from torpedo 12 by manipulating mounting nut 39 while supporting sensor mechanism 11 by handle 44. This completes the normal operational requirements of the sensor mechanism according to the invention. As may be readily appreciated, the operation of the device is self-sufficient and requires a minimum of time of trained personnel.

The foregoing description taken together with the appended claims constitutes a disclosure such as to enable a person skilled in the instrumentation and marine engineering arts and having the benefits of the teachings contained herein to make and use the invention. Further, the structure herein described meets the objects of the invention and generally constitutes a meritorous advance in the art unobvious to such skilled workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A sensor mechanism for detecting the movement of a rigid member about an axis of rotation comprising:

supporting means including a frame member for supporting the sensor mechanism in a predetermined position with respect to the rigid member;
follower means having an extended and a withdrawn position and mounted on the frame member of said supporting means for rotational movement about an axis thereon and configured to engage the rigid member when in the extended position;

generating means connected to said follower means for generating an electrical analog signal in response to the mechanical movement of the rigid member;

securing means effectively connected to said supporting means for selectively securing said supporting means in a fixed position with respect to the rigid member and releasing said supporting means from the fixed position; and actuation means connected between the follower means and the securing means for actuation of the follower means to its extended position when the supporting means is secured in the fixed position by said securing means and for actuation of the follower means to the withdrawn position in all other non-secured positions of the supporting means.

2. A sensor mechanism according to claim 1 (amended) wherein said follower means includes an arm having an elbow joint at a point intermediate its length.

3. A sensor mechanism according to claim 2 wherein said elbow joint is spring biased to the unflexed position and thereby straighten the follower arm.

4. A sensor mechanism according to claim 1 (amended) in which the generating means is connected to said follower means by a mechanical amplifier.

5. A sensor mechanism according to claim 4 (amended) further including first spring means effectively connected between said follower means and the aforesaid supporting means for biasing the follower means to a position where it contacts the aforesaid rigid member.

6. A sensor mechanism according to claim 5 (amended) wherein the aforesaid actuation means includes:

a rod reciprocally held by the aforesaid supporting means;

coupling means connecting the rod to the follower means for rotation to a retracted position where it does not contact the rigid member when the rod is displaced in one direction;

second spring means connected to the rod for urging the rod in said one direction; and a pressure member engaged by the aforesaid securing means and positioned to drivingly engage the rod so as to force the rod in a direction opposing the urging of the second spring means to cause the follower means to engage the rigid member when said securing means secures said supporting means in the fixed position and to retract said follower means when said securing means releases said supporting means.

7. A sensor mechanism according to claim 1 (amended) in which said frame member of said supporting means is of annular shape.

8. A sensor mechanism according to claim 7 (amended) in which the aforesaid securing means is configured to hold the annular frame member about the drive shaft of a propeller driven vehicle.

9. A sensor mechanism according to claim 8 (amended) in which the aforesaid rigid member engaged by said follower means comprises the rudder of said propeller driven vehicle which is displaced in a rotary motion about an axis extending at a right angle to said drive shaft of the propeller driven vehicle.

* * * * *